United States Patent
Zhu et al.

(10) Patent No.: US 9,325,238 B2
(45) Date of Patent: Apr. 26, 2016

(54) VOLTAGE ADJUSTMENT METHOD, AND VOLTAGE PRE-REGULATOR POWER SUPPLY CIRCUIT AND SYSTEM

(71) Applicant: Huawei Technologies Co., Ltd., Shenzhen (CN)

(72) Inventors: Pinhua Zhu, Shenzhen (CN); Hengbiao Wang, Shenzhen (CN); Wenzong Cao, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 153 days.

(21) Appl. No.: 14/334,717

(22) Filed: Jul. 18, 2014

(65) Prior Publication Data

US 2014/0327417 A1    Nov. 6, 2014

Related U.S. Application Data

(63) Continuation of application No. PCT/CN2013/085616, filed on Oct. 21, 2013.

(30) Foreign Application Priority Data

Dec. 12, 2012 (CN) .......................... 2012 1 0535450

(51) Int. Cl.
*H02M 3/335* (2006.01)
*H02M 3/156* (2006.01)
(Continued)

(52) U.S. Cl.
CPC ............ *H02M 3/156* (2013.01); *H02M 3/1582* (2013.01); *H02M 3/1584* (2013.01); *H02M 2001/007* (2013.01)

(58) Field of Classification Search
CPC ............ H02M 3/158; H02M 3/33569; H02M 2001/0009; G05F 1/44; G05F 1/56

USPC .............. 323/222, 224, 237, 266–268, 271, 323/282–288; 363/16–17, 21.01, 21.05, 49, 363/97, 98
See application file for complete search history.

(56) References Cited

U.S. PATENT DOCUMENTS 5,502,630 A * 3/1996 Rokhvarg ........... H02M 1/4208
                                                        323/222
5,999,419 A    12/1999 Marrero
(Continued)

FOREIGN PATENT DOCUMENTS

CN    101106328 A    1/2008
CN    202260542 U    5/2012
(Continued)

OTHER PUBLICATIONS

Partial English Translation and Abstract of Chinese Patent Application No. CN102983745A, Aug. 30, 2014, 36 pages.
(Continued)

*Primary Examiner* — Rajnikant Patel
(74) *Attorney, Agent, or Firm* — Conley Rose, P.C.; Grant Rodolph; William H. Dietrich

(57) ABSTRACT

A voltage adjustment method, and a voltage pre-regulator power supply circuit and system, that implements highly-efficient output of a power supply in a quasi straight-through state and increases voltage output precision of a circuit. The voltage adjustment method includes receiving a to-be-adjusted voltage through a positive wire input end and a negative wire input end; changing, in a control mode in which a connection time is fixed and a disconnection time is adjusted, a duty cycle for the to-be-adjusted voltage to obtain a primary adjusted voltage; and changing, in a control mode in which a disconnection time is fixed and a connection time is adjusted, a duty cycle for the primary adjusted voltage to obtain an output voltage. The present disclosure is applied to a non-isolated direct-current quasi straight-through pre-regulator power supply.

5 Claims, 6 Drawing Sheets

(51) Int. Cl.
*H02M 3/158* (2006.01)
*H02M 1/00* (2007.01)

(56) References Cited

U.S. PATENT DOCUMENTS

| | | | | |
|---|---|---|---|---|
| 6,949,915 | B2 * | 9/2005 | Stanley | H02M 1/4208 323/207 |
| 7,254,046 | B2 * | 8/2007 | Kawasaki | H02M 3/33569 363/16 |
| 7,403,400 | B2 * | 7/2008 | Stanley | G05F 1/70 323/225 |
| 8,618,781 | B2 * | 12/2013 | Miyamae | H02M 3/157 323/271 |
| 2008/0013345 | A1 | 1/2008 | Takeshita et al. | |
| 2013/0082531 | A1 | 4/2013 | Quan et al. | |

FOREIGN PATENT DOCUMENTS

| | | |
|---|---|---|
| CN | 102983745 A | 3/2013 |
| TW | 201249085 A | 12/2012 |

OTHER PUBLICATIONS

Foreign Communication From a Counterpart Application, PCT Application No. PCT/CN2013/085616, English Translation of International Search Report dated Jan. 30, 2014, 2 pages.

Foreign Communication From a Counterpart Application, PCT Application No. PCT/CN2013/085616, Written Opinion dated Jan. 30, 2014, 6 pages.

* cited by examiner

VOLTAGE ADJUSTMENT METHOD, AND VOLTAGE PRE-REGULATOR POWER SUPPLY CIRCUIT AND SYSTEM

CROSS-REFERENCE TO RELATED APPLICATIONS

This application is a continuation of International Application No. PCT/CN2013/085616, filed on Oct. 21, 2013, which claims priority to Chinese Patent Application No. 201210535450.1, filed on Dec. 12, 2012, both of which are hereby incorporated by reference in their entireties.

TECHNICAL FIELD

The present disclosure relates to the electronics field, and in particular, to a voltage adjustment method, and a voltage pre-regulator power supply circuit and system.

BACKGROUND

A power module is a power supply that can be directly mounted on a printed circuit board. It is characterized by supplying power to a dedicated integrated circuit, a digital signal processor, a microprocessor, a memory, a field programmable gate array, and other digital or analog loads. Generally, this type of module is referred to as a point-of-load power supply system or a point-of-use power supply system. A modular structure has a plurality of advantages. Therefore, a modular power supply is widely used in a switch device, an access device, mobile communications, microwave communications, optical transmission, a router, and the like in the communications field, and auto electronics, aeronautics and astronautics, and the like. A modular power supply has an isolation function, a strong anti-interference capability and its own protection function, and is easy to integrate. In an application scenario in which voltage conversion needs to be performed, a power module further includes an alternating current-direct current (AC-DC) converter or a direct current-direct current (DC-DC) converter.

A power module is relatively commonly used for various circuits. An existing direct-current voltage pre-regulator power supply applies an isolation function of the power module. Meanwhile, a power supply convertor or direct-current convertor is also applied to an architecture of such circuits.

However, the existing direct-current voltage pre-regulator power supply mainly adopts a completely-isolated circuit architecture and non-isolated completely-straight-through circuit architecture. A circuit structure that adopts the isolated architecture is complex, so that power supply output efficiency is low and precision of an output voltage is poor.

SUMMARY

Embodiments of the present disclosure provide a voltage adjustment method, and a voltage pre-regulator power supply circuit and system, which may implement highly-efficient output of a power supply in a quasi straight-through state, and increase voltage output precision of a circuit.

To achieve the foregoing objectives, the embodiments of the present disclosure adopt following technical solutions:

In a first aspect, a voltage pre-regulator power supply circuit is provided and includes a voltage step-up unit, including a positive wire input end, a negative wire input end, a first positive wire output end corresponding to the positive wire input end, and a first negative wire output end corresponding to the negative wire input end. The positive wire input end and the negative wire input end are configured to input a to-be-adjusted voltage to the voltage step-up unit. The first positive wire output end and the first negative wire output end are configured to output the to-be-adjusted voltage that has been adjusted by the voltage step-up unit to obtain a primary to-be-adjusted voltage The voltage step-up unit controls the to-be-adjusted voltage by using a voltage difference frequency. A voltage step-down unit includes a first positive wire input end, a first negative wire input end, a positive wire output end corresponding to the first positive wire input end, and a negative wire output end corresponding to the first negative wire input end. The first positive wire input end is connected to the first positive wire output end, and the first negative wire input end is connected to the first negative wire output end. The first positive wire input end and the first negative wire input end are configured to input the primary to-be-adjusted voltage to the voltage step-down unit. The positive wire output end and the negative wire output end are configured to output the primary to-be-adjusted voltage that has been adjusted by the voltage step-down unit to obtain an output voltage. The voltage step-down unit controls, by using the voltage difference frequency, the primary to-be-adjusted voltage that is input through the first positive wire input end and the first negative wire input end.

In a first possible implementation manner, with reference to the first aspect, the voltage pre-regulator power supply circuit further includes a third capacitor, a fourth capacitor, a positive wire current control module, and a negative wire current control module. The positive wire current control module includes a first capacitor, where a first electrode of the first capacitor is connected to the positive wire input end and a second electrode of the first capacitor is connected to the negative wire input end; a first inductor, where a first electrode of the first inductor is connected to the positive wire input end; a first driving pulser, where the first driving pulser is formed by a first metal-oxide-semiconductor (MOS) type field-effect transistor and a third diode, where a drain electrode of the first MOS type field-effect transistor is connected to a negative electrode of the third diode, a source electrode of the first MOS type field-effect transistor is connected to a positive electrode of the third diode, a grid electrode of the first MOS type field-effect transistor inputs a first voltage adjustment pulse signal, and the drain electrode of the first MOS type field-effect transistor is connected to a second electrode of the first inductor; a first diode, where a positive electrode of the first diode is connected to the second electrode of the first inductor and a negative electrode of the first diode is connected to the first positive wire output end; and a second capacitor, where a first electrode of the second capacitor is connected to the first positive wire output end and a second electrode of the second capacitor is connected to the first negative wire output end, and a first electrode of the third capacitor is connected to the source electrode of the first MOS type field-effect transistor and the negative wire input end, and a second electrode of the third capacitor is connected to the first negative wire output end. The negative wire current control module includes: the first capacitor, where the first electrode of the first capacitor is connected to the positive wire input end and the second electrode of the first capacitor is connected to the negative wire input end; a second inductor, where a first electrode of the second inductor is connected to the negative wire input end; a second driving pulser, where the second driving pulser is formed by a second MOS type field-effect transistor and a fourth diode, where a drain electrode of the second MOS type field-effect transistor is connected to a negative electrode of the fourth diode, a source electrode of the second MOS type field-effect transistor is connected to a positive electrode of the fourth diode, a grid electrode of the second MOS type field-effect transistor inputs a second voltage adjustment pulse signal, and the source electrode of the second MOS type field-effect transistor is connected to a second electrode of the second inductor; a second diode, where a negative electrode of the second diode is connected to the second electrode of the second inductor and a positive electrode of the second diode is connected to the first negative wire output end; and the second capacitor. The first electrode of the second capacitor is connected to the first positive wire output end and the second electrode of the second capacitor is connected to the first negative wire output end. A first electrode of the fourth capacitor is connected to the drain electrode of the second MOS-type field-effect transistor and the positive wire input end, and a second electrode of the fourth capacitor is connected to the first positive wire output end.

In a second possible implementation manner, with reference to the first aspect or the first possible implementation manner of the first aspect, the voltage pre-regulator power supply circuit further includes the voltage step-down unit including the second capacitor, where the first electrode of the second capacitor is connected to the first positive wire input end and the second electrode of the second capacitor is connected to the first negative wire input end; a third driving pulser, where the third driving pulser is formed by a third MOS type field-effect transistor and a sixth diode, where a drain electrode of the third MOS type field-effect transistor is connected to a negative electrode of the sixth diode and a source electrode of the third MOS type field-effect transistor is connected to a positive electrode of the sixth diode, a grid electrode of the third MOS type field-effect transistor inputs a third voltage adjustment pulse signal, and the drain electrode of the third MOS type field-effect transistor is further connected to the first positive wire input end; a fifth diode, where a negative electrode of the fifth diode is connected to the source electrode of the third MOS type field-effect transistor, and a positive electrode of the fifth diode is connected to the first negative wire input end; a third inductor, where a first electrode of the third inductor is connected to the negative electrode end of the fifth diode; and a fifth capacitor, where a first electrode of the fifth capacitor is connected to a second electrode of the third inductor and the positive wire output end, and a second electrode of the fifth capacitor is connected to the negative wire output end.

In a second aspect, a voltage pre-regulator power supply circuit system is provided and includes multiple voltage pre-regulator power supply circuits connected in parallel, where the voltage pre-regulator power supply circuit is any voltage pre-regulator power supply circuit described in the first aspect, the first possible implementation manner of the first aspect, and the second possible implementation manner of the first aspect.

In a third aspect, a voltage adjustment method is provided and includes receiving a to-be-adjusted voltage through a positive wire input end and a negative wire input end; changing, in a control mode in which a connection time is fixed and a disconnection time is adjusted, a duty cycle for the to-be-adjusted voltage to obtain a primary adjusted voltage; and changing, in a control mode in which a disconnection time is fixed and a connection time is adjusted, a duty cycle for the primary adjusted voltage to obtain an output voltage.

With the voltage adjustment method, and the voltage pre-regulator power supply circuit and system provided in the embodiments of the present disclosure, a voltage step-up unit separately controls, by voltage difference frequency control, a current input through a positive wire input end and a current input through a negative wire input end to obtain a primary to-be-adjusted voltage; a voltage step-down unit adjusts, by the voltage difference frequency control, the primary to-be-adjusted voltage to obtain an output voltage. When a voltage difference between an input voltage and an output voltage is small, a switching frequency is reduced to implement a quasi straight-through state so as to implement highly-efficient output of a power supply and increase voltage output precision for a circuit.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The embodiments to be described are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
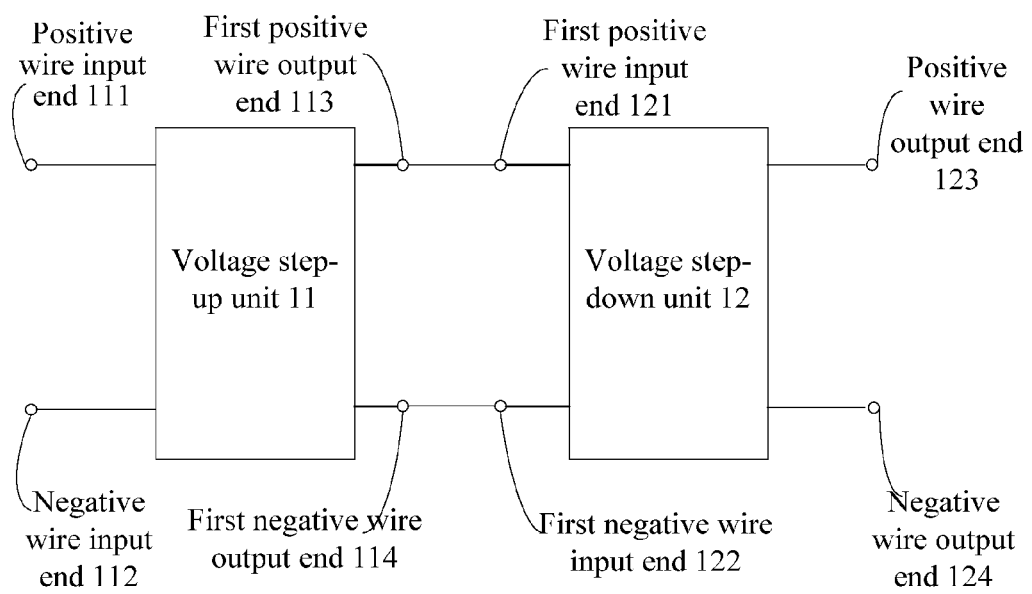
FIG. 1 is a schematic structural diagram of a voltage pre-regulator power supply circuit according to an embodiment of the present disclosure.

An embodiment of the present disclosure provides a voltage pre-regulator power supply circuit, as shown in FIG. 1. The voltage pre-regulator power supply circuit includes a voltage step-up unit 11 and a voltage step-down unit 12. The voltage step-up unit 11 includes a positive wire input end 111, a negative wire input end 112, a first positive wire output end 113 corresponding to the positive wire input end 111, and a first negative wire output end 114 corresponding to the negative wire input end 112. The positive wire input end 111 and the negative wire input end 112 are configured to input a to-be-adjusted voltage to the voltage step-up unit 11. The first positive wire output end 113 and the first negative wire output end 114 are configured to output the to-be-adjusted voltage that has been adjusted by the voltage step-up unit 11. The voltage step-up unit 11 controls the to-be-adjusted voltage by using a voltage difference frequency.

The voltage step-down unit 12 includes a first positive wire input end 121, a first negative wire input end 122, a positive wire output end 123 corresponding to the first positive wire input end 121, and a negative wire output end 124 corresponding to the first negative wire input end 122. The first positive wire input end 121 is connected to the first positive wire output end 113. The first negative wire input end 122 is connected to the first negative wire output end 114. The first positive wire input end 121 and the first negative wire input end 122 are configured to input a primary to-be-adjusted voltage to the voltage step-down unit 12. The positive wire output end 123 and the negative wire output end 124 are configured to output the primary to-be-adjusted voltage that has been adjusted by the voltage step-down unit to obtain an output voltage. The voltage step-down unit 12 controls, by using the voltage difference frequency, the primary to-be-adjusted voltage that is input through the first positive wire input end 121 and the first negative wire input end 122.

With the voltage pre-regulator power supply circuit provided in this embodiment of the present disclosure, a voltage step-up unit separately controls, by means of voltage difference frequency control, a current input through a positive wire input end and a current input through a negative wire input end to obtain a primary to-be-adjusted voltage. A voltage step-down unit adjusts, by means of the voltage difference frequency control, the primary to-be-adjusted voltage to obtain an output voltage. A highly-efficient output of a power supply in a quasi straight-through state is implemented, and voltage output precision of a circuit is increased.

Figure 2:
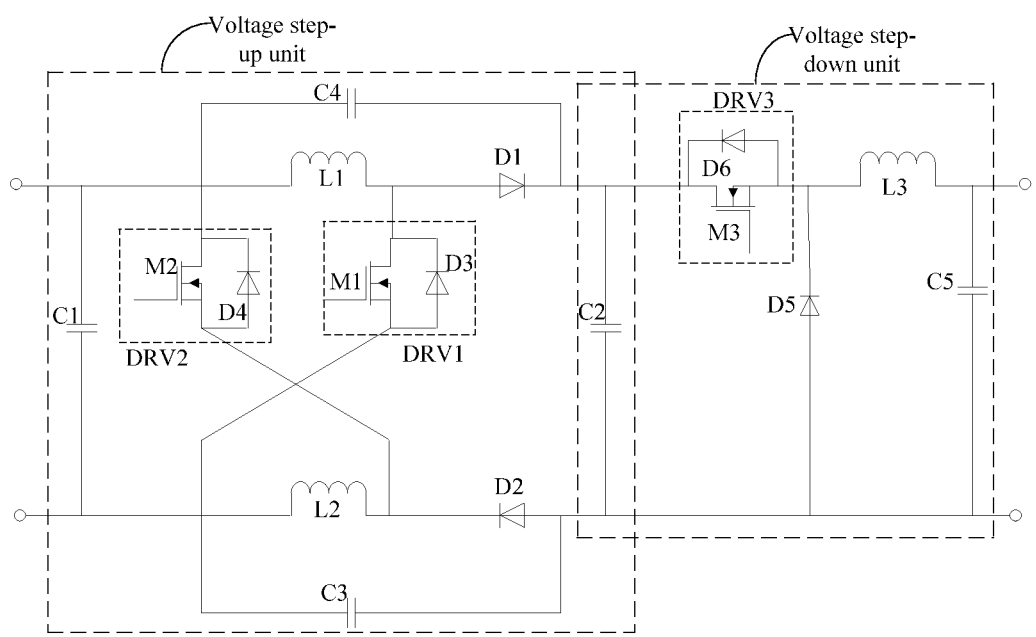
FIG. 2 is a schematic diagram of a voltage pre-regulator power supply circuit according to an embodiment of the present disclosure.
Figure 3:
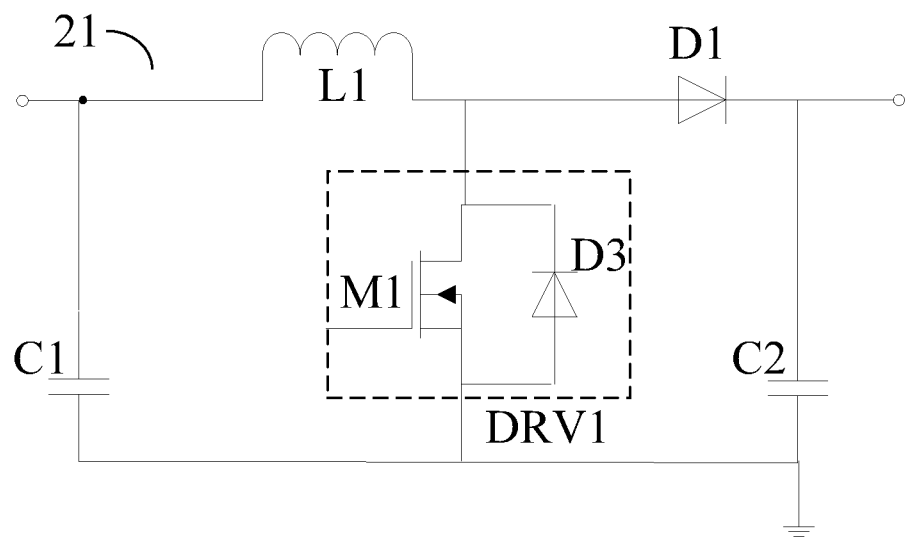
FIG. 3 is a schematic diagram of a positive wire current control module of a voltage step-up unit in a voltage pre-regulator power supply circuit system according to an embodiment of the present disclosure.
Figure 4:
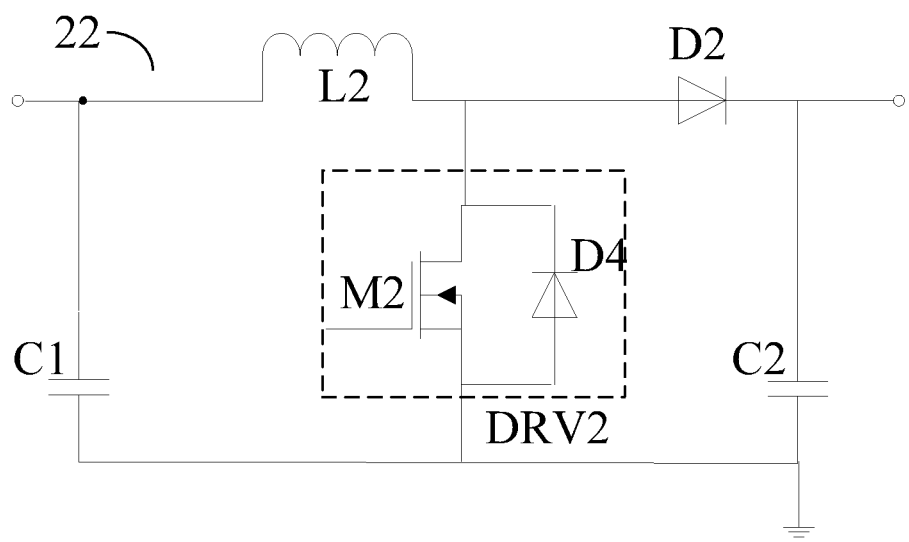
FIG. 4 is a schematic diagram of a negative wire current control module of a voltage step-up unit in a voltage pre-regulator power supply circuit system according to an embodiment of the present disclosure.

An embodiment of the present disclosure provides a voltage pre-regulator power supply circuit, as shown in FIG. 2. The voltage pre-regulator power supply circuit includes a third capacitor C3, a fourth capacitor C4, a positive wire current control module 21 (FIG. 3), and a negative wire current control module 22 (FIG. 4). As shown in FIG. 3, the positive wire current control module 21 includes a first capacitor C1, where a first electrode of the first capacitor C1 is connected to a positive wire input end and a second electrode of the first capacitor C1 is connected to a negative wire input end; a first inductor L1, where a first electrode of the first inductor L1 is connected to the positive wire input end; a first driving pulser DRV1, where the first driving pulser DRV1 is formed by a first MOS type field-effect transistor M1 and a third diode D3, where a drain electrode of the first MOS type field-effect transistor M1 is connected to a negative electrode end of the third diode D3, a source electrode of the first MOS type field-effect transistor M1 is connected to a positive electrode end of the third diode D3, a grid electrode of the first MOS type field-effect transistor M1 inputs a first voltage adjustment pulse signal, and the drain electrode of the first MOS type field-effect transistor M1 is connected to a second electrode of the first inductor L1; a first diode D1, where a positive electrode of the first diode D1 is connected to the second electrode of the first inductor L1 and a negative electrode of the first diode D1 is connected to a first positive wire output end; and a second capacitor C2, where a first electrode of the second capacitor C2 is connected to the first positive wire output end and a second electrode of the second capacitor C2 is connected to a first negative wire output end.

A first electrode of the third capacitor C3 is connected to the source electrode of the first MOS field-effect transistor M1 and the negative wire input end A second electrode of the third capacitor C3 is connected to the first negative wire output end.

Figure 6:
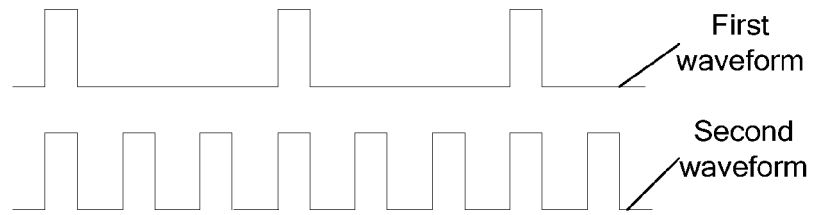
FIG. 6 is a schematic diagram of a first voltage adjustment pulse signal or a second voltage adjustment pulse signal of a voltage step-up unit in a voltage pre-regulator power supply circuit according to an embodiment of the present disclosure.

In some embodiments, with reference to FIG. 3 and FIG. 6, the first voltage adjustment pulse signal is input into the grid electrode of the first MOS type field-effect transistor A switching frequency of the first MOS type field-effect transistor is controlled by adjusting a duty cycle of the pulse signal so as to implement adjustment of a voltage difference between an input voltage and an output voltage. When the duty cycle of the first voltage adjustment pulse signal is relatively high, the switching frequency is relatively high and the voltage difference between the input voltage and the output voltage is relatively large. In some embodiments, when a waveform of the first voltage adjustment pulse signal is a second waveform shown in FIG. 6, the duty cycle of the first voltage adjustment pulse signal is relatively high, the switching frequency is relatively high and the voltage difference between the input voltage and the output voltage is relatively large. When the duty cycle of the first voltage adjustment pulse signal is relatively low, the switching frequency is relatively low and the voltage difference between the input voltage and the output voltage is relatively small. In some embodiments, when the waveform of the first voltage adjustment pulse signal is a first waveform shown in FIG. 6, the duty cycle of the first voltage adjustment pulse signal is relatively low, the switching frequency is relatively low and the voltage difference between the input voltage and the output voltage is small.

Working loss of the MOS type field-effect transistor includes connection loss and switching loss. In this case, if the positive wire current control module working in the voltage step-up unit wants to a reach quasi straight-through state, switching loss of a circuit needs to be reduced. When the voltage difference between the input voltage and the out voltage is small, the MOS type field-effect transistor fixes a connection time and increases a disconnection time, and reduces the switching frequency, which may reduce the switching loss and enable the circuit to work in a quasi straight-through state.

As shown in FIG. 4, the negative wire current control module 22 includes the first capacitor C1, where the first electrode of the first capacitor C1 is connected to the positive wire input end and the second electrode of the first capacitor C1 is connected to the negative wire input end; a second inductor L2, where a first electrode of the second inductor L2 is connected to the negative wire input end; a second driving pulser DRV2, where the second driving pulser DRV2 is formed by a second MOS type field-effect transistor M2 and a fourth diode D4, where a drain electrode of the second MOS type field-effect transistor M2 is connected to a negative electrode end of the fourth diode D4, a source electrode of the second MOS type field-effect transistor M2 is connected to a positive electrode end of the fourth diode D4, a grid electrode of the second MOS type field-effect transistor inputs a second voltage adjustment pulse signal, and the source electrode of the second MOS type field-effect transistor M2 is connected to a second electrode of the second inductor L2; a second diode D2, where a negative electrode of the second diode D2 is connected to the second electrode of the second inductor L2 and a positive electrode of the second diode D2 is connected to the first negative wire output end; and the second capacitor C2, where the first electrode of the second capacitor C2 is connected to the first positive wire output end and the second electrode of the second capacitor C2 is connected to the first negative wire output end.

A first electrode of the fourth capacitor C4 is connected to the drain electrode of the second MOS type field-effect transistor M2 and the positive wire input end, and a second electrode of the fourth capacitor C4 is connected to the first positive wire output end.

In some embodiments, with reference to FIG. 4 and FIG. 6, a voltage of two ends of a capacitor, that is, the third capacitor, on a negative wire loop may be adjusted by adjusting the duty cycle of the first voltage adjustment pulse signal so as to implement voltage compensation at the first negative wire output end. A voltage of two ends of a capacitor, that is, the fourth capacitor, on a positive wire loop may be adjusted by adjusting a duty cycle of the second voltage adjustment pulse signal so as to implement voltage compensation at the first positive wire output end so that a current at the positive wire input end and a current at the negative wire input end are consistent.

In some embodiments, the second voltage adjustment pulse signal is input into the grid electrode of the second MOS type field-effect transistor, and a switching frequency of the second MOS type field-effect transistor is controlled by adjusting the duty cycle of the pulse signal so as to implement adjustment of a voltage difference between an input voltage and an output voltage. When the duty cycle of the second voltage adjustment pulse signal is relatively high, the switching frequency is relatively high and the voltage difference between the input voltage and the output voltage is relatively large. In some embodiments, when a waveform of the second voltage adjustment pulse signal is a second waveform shown in FIG. 6, the duty cycle of the second voltage adjustment pulse signal is relatively high, the switching frequency is relatively high and the voltage difference between the input voltage and the output voltage is relatively large. When the duty cycle of the second voltage adjustment pulse signal is relatively low, the switching frequency is relatively low and the voltage difference between the input voltage and the output voltage is relatively small. In some embodiments, when the waveform of the second voltage adjustment pulse signal is a first waveform shown in FIG. 6, the duty cycle of the second voltage adjustment pulse signal is relatively low, the switching frequency is relatively low and the voltage difference between the input voltage and the output voltage is small.

Working loss of the MOS type field-effect transistor includes connection loss and switching loss. In this case, if the positive wire current control module working in the voltage step-up unit wants to reach a quasi straight-through state, switching loss of a circuit needs to be reduced. When the voltage difference between the input voltage and the output voltage is small, the MOS type field-effect transistor fixes a connection time and increases a disconnection time, and reduces the switching frequency, which may reduce the switching loss and enable the circuit to work in a quasi straight-through state.

Figure 5:
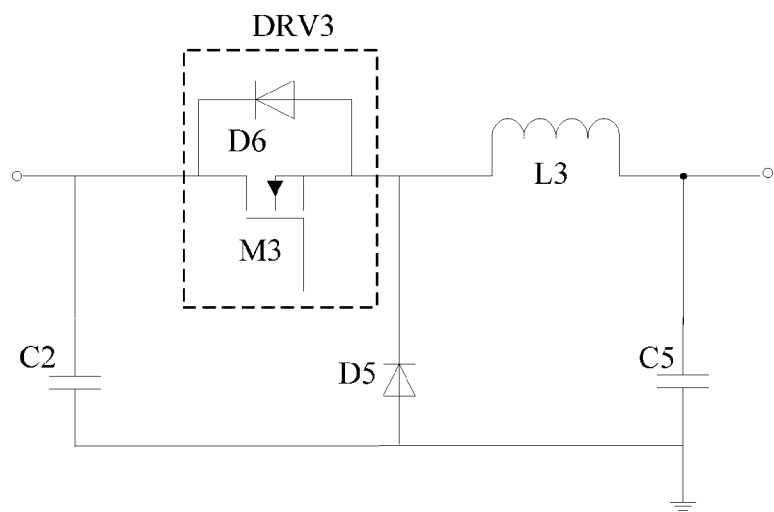
FIG. 5 is a schematic diagram of a voltage step-down unit in a voltage pre-regulator power supply circuit system according to an embodiment of the present disclosure.

In some embodiments, as shown in FIG. 5, the voltage step-down unit 12 includes the second capacitor C2, where the first electrode of the second capacitor C2 is connected to the first positive wire input end and the second electrode of the second capacitor C2 is connected to the first negative wire input end; a third driving pulser DRV3, where the third driving pulser DRV3 is formed by a third MOS type field-effect transistor M3 and a sixth diode D6, where a drain electrode of the third MOS type field-effect transistor M3 is connected to a negative electrode end of the sixth diode D6 and a source electrode of the third MOS type field-effect transistor M3 is connected to a positive electrode end of the sixth diode D6, a grid electrode of the third MOS type field-effect transistor M3 inputs a third voltage adjustment pulse signal, and the drain electrode of the third MOS type field-effect transistor M3 is further connected to the first positive wire input end; a fifth diode D5, where a negative electrode of the fifth diode D5 is connected to the source electrode of the third MOS type field-effect transistor M3, and a positive electrode of the fifth diode D5 is connected to the first negative wire input end; a third inductor L3, where a first electrode of the third inductor L3 is connected to the negative electrode of the fifth diode D5; and a fifth capacitor C5, where a first electrode of the fifth capacitor C5 is connected to a second electrode of the third inductor L3 and the positive wire output end, and a second electrode of the fifth capacitor C5 is connected to the negative wire output end.

Figure 7:
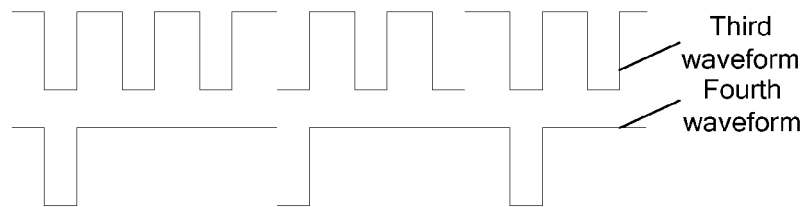
FIG. 7 is a schematic diagram of a third voltage adjustment pulse signal of a voltage step-down unit in a voltage pre-regulator power supply circuit according to an embodiment of the present disclosure.

In some embodiments, with reference to FIG. 5 and FIG. 7, the third voltage adjustment pulse signal is input into the grid electrode of the third MOS type field-effect transistor, and a switching frequency of the third MOS type field-effect transistor is controlled by adjusting a duty cycle of the pulse signal so as to implement adjustment of a voltage difference between an input voltage and an output voltage. When the duty cycle of the third voltage adjustment pulse signal is relatively low, the switching frequency is relatively high and the voltage difference between the input voltage and the output voltage is relatively large. In some embodiments, when a waveform of the third voltage adjustment pulse signal is a third waveform shown in FIG. 7, the duty cycle of the third voltage adjustment pulse signal is relatively low, the switching frequency is relatively high and the voltage difference between the input voltage and the output voltage is relatively large. When the duty cycle of the third voltage adjustment pulse signal is relatively high, the switching frequency is relatively low and the voltage difference between the input voltage and the output voltage is relatively small. In some embodiments, when the waveform of the third voltage adjustment pulse signal is a fourth waveform shown in FIG. 7, the duty cycle of the third voltage adjustment pulse signal is relatively high, the switching frequency is relatively low and the voltage difference between the input voltage and the output voltage is small.

Working loss of the MOS type field-effect transistor includes connection loss and switching loss. In this case, if the positive wire current control module working in the voltage step-down unit wants to reach a quasi straight-through state, switching loss of a circuit needs to be reduced. When the voltage difference between the input voltage and the output voltage is small, the MOS type field-effect transistor fixes a disconnection time and increases a connection time, and reduces the switching frequency, which may reduce the switching loss and enable the circuit to work in a quasi straight-through state.

The first MOS type field-effect transistor, the second MOS type field-effect transistor, and the third MOS type field-effect transistor in the foregoing embodiment are all described by using low-level-connected N type MOS type field-effect transistors as an example. It is also feasible that any one or all of the foregoing MOS type field-effect transistors adopt a P type MOS type field-effect transistor so long as a waveform of an input voltage adjustment pulse signal corresponding to a grid electrode of each MOS field-effect transistor is readjusted. Such variations may be readily appreciated by a person skilled in the art, fall within the protection scope of the present disclosure, and are not described herein again.

With the voltage pre-regulator power supply circuit provided in this embodiment of the present disclosure, a voltage step-up unit separately controls, by voltage difference frequency control, a current input through a positive wire input end and a current input through a negative wire input end to obtain a primary to-be-adjusted voltage; a voltage step-down unit adjusts, by the voltage difference frequency control, the primary to-be-adjusted voltage to obtain an output voltage. When a voltage difference between an input voltage and an output voltage is small, a switching frequency is reduced, highly-efficient output of a power supply in a quasi straight-through state is implemented, and voltage output precision of a circuit is increased. Meanwhile, a function of controlling a ground cable current is also implemented.

Figure 8:
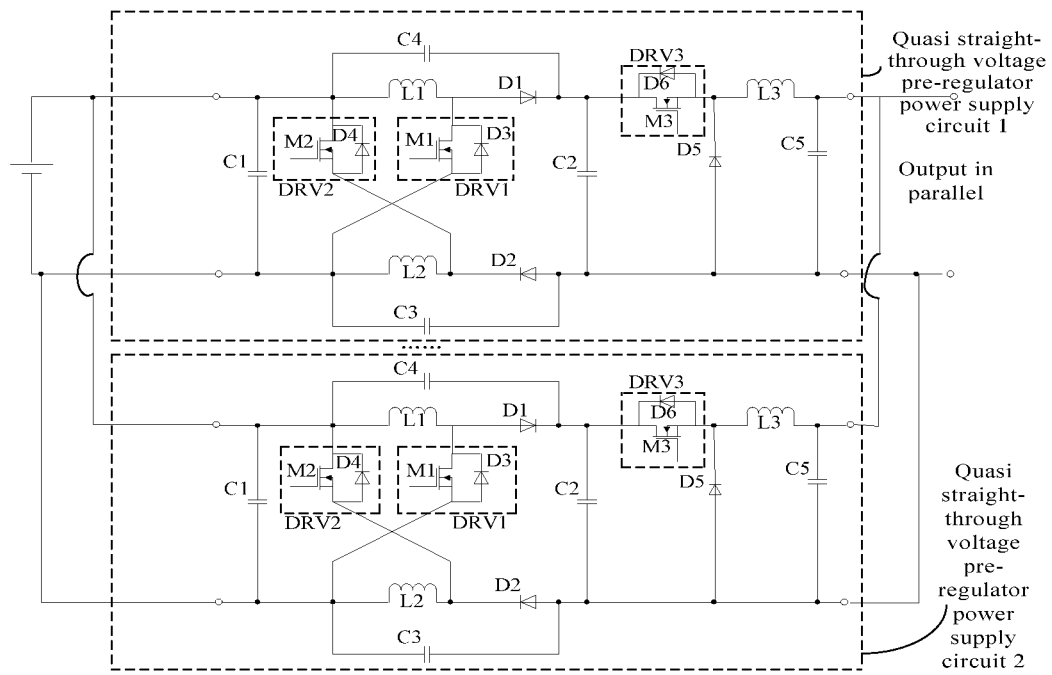
FIG. 8 is a circuit diagram of a quasi straight-through voltage pre-regulator power supply circuit system according to an embodiment of the present disclosure.

An embodiment of the present disclosure provides a voltage pre-regulator power supply circuit system, as shown in FIG. 8, including multiple voltage pre-regulator power supply circuits connected in parallel, where an input side is a voltage step-up topology that adopts the voltage step-up unit in the foregoing embodiment, that is, includes a positive wire current control module and a negative wire current control module; and an output side is a voltage step-down topology that is formed by adopting the voltage step-down unit in the foregoing embodiment, and output voltages of all the voltage pre-regulator power supply circuits connected in parallel are eventually output in parallel to obtain a required output voltage.

The voltage pre-regulator power supply circuit system provided in this embodiment of the present disclosure enables a power supply to work in a quasi straight-through state, which implements a high-precision output voltage, increases a response speed of a voltage feedback loop, and meanwhile, ensures high efficiency of the power supply and further implements a function of controlling a ground cable current. Multiple modules may output voltages in parallel and balance of a negative wire current is ensured when the multiple modules output in parallel.

Figure 9:
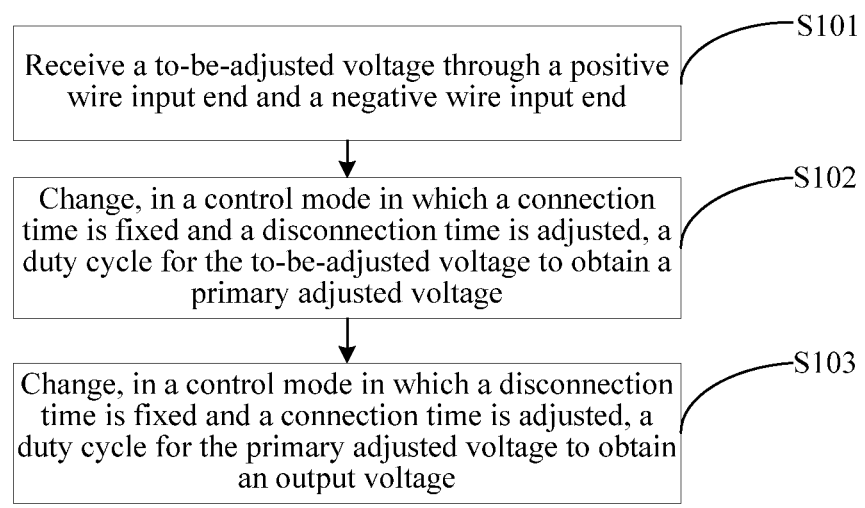
FIG. 9 is a schematic flowchart diagram of a voltage adjustment method according to an embodiment of the present disclosure.

An embodiment of the present disclosure provides a voltage adjustment method, where the method may be applied to the power supply circuit described in the foregoing embodiment. As shown in FIG. 9, the method includes the following steps.

S101. Receive a to-be-adjusted voltage through a positive wire input end and a negative wire input end.

S102. Change, in a control mode in which a connection time is fixed and a disconnection time is adjusted, a duty cycle for the to-be-adjusted voltage to obtain a primary adjusted voltage.

S103. Change, in a control mode in which a disconnection time is fixed and a connection time is adjusted, a duty cycle for the primary adjusted voltage to obtain an output voltage.

With the voltage adjustment method provided in this embodiment of the present disclosure, a current input through a positive wire input end and a current input through a negative wire input end are separately controlled by voltage difference frequency control to obtain a primary to-be-adjusted voltage, and the primary to-be-adjusted voltage is adjusted the voltage difference frequency control to obtain an output voltage so as to implement highly-efficient output of a power supply in a quasi straight-through state and increase voltage output precision of a circuit.

A person of ordinary skill in the art may understand that all or a part of the steps of the foregoing method embodiments may be performed by a program instructing relevant hardware. The foregoing program may be stored in a computer readable storage medium. When the program executes, the steps of the foregoing method embodiments are performed. The foregoing storage medium includes any medium that can store program code, such as a read-only memory (ROM), a random access memory (RAM), a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure. Therefore, the protection scope of the present disclosure shall be subject to the protection scope of the claims.

What is claimed is:

1. A voltage pre-regulator power supply circuit, comprising:
   a voltage step-up unit comprising a positive wire input end, a negative wire input end, a first positive wire output end corresponding to the positive wire input end, and a first negative wire output end corresponding to the negative wire input end, wherein the positive wire input end and the negative wire input end are configured to input a to-be-adjusted voltage to the voltage step-up unit, wherein the first positive wire output end and the first negative wire output end are configured to output the to-be-adjusted voltage that has been adjusted by the voltage step-up unit to obtain a primary to-be-adjusted voltage, and wherein the voltage step-up unit is configured to control the to-be-adjusted voltage by using a voltage difference frequency; and
   a voltage step-down unit, comprising a first positive wire input end, a first negative wire input end, a positive wire output end corresponding to the first positive wire input end, and a negative wire output end corresponding to the first negative wire input end, wherein the first positive wire input end is connected to the first positive wire output end, wherein the first negative wire input end is connected to the first negative wire output end, wherein the first positive wire input end and the first negative wire input end are configured to input the primary to-be-adjusted voltage to the voltage step-down unit, wherein the positive wire output end and the negative wire output end are configured to output the primary to-be-adjusted voltage that has been adjusted by the voltage step-down unit to obtain an output voltage, and wherein the voltage step-down unit is configured to control, by using the voltage difference frequency, the primary to-be-adjusted voltage that is input through the first positive wire input end and the first negative wire input end.

2. The circuit according to claim 1, wherein the voltage step-up unit comprises a third capacitor, a fourth capacitor, a positive wire current control module, and a negative wire current control module, wherein the positive wire current control module comprises:
   a first capacitor, wherein a first electrode of the first capacitor is connected to the positive wire input end and a second electrode of the first capacitor is connected to the negative wire input end;
   a first inductor, wherein a first electrode of the first inductor is connected to the positive wire input end;
   a first driving pulser, wherein the first driving pulser is formed by a first metal oxide semiconductor (MOS) type field-effect transistor and a third diode, wherein a drain electrode of the first MOS type field-effect transistor is connected to a negative electrode of the third diode, wherein a source electrode of the first MOS type field-effect transistor is connected to a positive electrode of the third diode, wherein a grid electrode of the first MOS type field-effect transistor is configured to input a first voltage adjustment pulse signal, and wherein the drain electrode of the first MOS type field-effect transistor is connected to a second electrode of the first inductor;

a first diode, wherein a positive electrode of the first diode is connected to the second electrode of the first inductor and a negative electrode of the first diode is connected to the first positive wire output end;

a second capacitor, wherein a first electrode of the second capacitor is connected to the first positive wire output end and a second electrode of the second capacitor is connected to the first negative wire output end, wherein a first electrode of the third capacitor is connected to the source electrode of the first MOS type field-effect transistor and the negative wire input end, and a second electrode of the third capacitor is connected to the first negative wire output end, and wherein the negative wire current control module comprises:

the first capacitor, wherein the first electrode of the first capacitor is connected to the positive wire input end, and wherein the second electrode of the first capacitor is connected to the negative wire input end;

a second inductor, wherein a first electrode of the second inductor is connected to the negative wire input end;

a second driving pulser, wherein the second driving pulser is formed by a second MOS type field-effect transistor and a fourth diode, wherein a drain electrode of the second MOS type field-effect transistor is connected to a negative electrode of the fourth diode, wherein a source electrode of the second MOS type field-effect transistor is connected to a positive electrode of the fourth diode, wherein a grid electrode of the second MOS type field-effect transistor is configured to input a second voltage adjustment pulse signal, and the source electrode of the second MOS type field-effect transistor is connected to a second electrode of the second inductor;

a second diode, wherein a negative electrode of the second diode is connected to the second electrode of the second inductor and a positive electrode of the second diode is connected to the first negative wire output end;

the second capacitor, wherein the first electrode of the second capacitor is connected to the first positive wire output end, and wherein the second electrode of the second capacitor is connected to the first negative wire output end; and a first electrode of the fourth capacitor is connected to the drain electrode of the second MOS-type field-effect transistor and the positive wire input end, and wherein a second electrode of the fourth capacitor is connected to the first positive wire output end.

3. The circuit according to claim 1, wherein the voltage step-down unit comprises:

the second capacitor, wherein the first electrode of the second capacitor is connected to the first positive wire input end, and wherein the second electrode of the second capacitor is connected to the first negative wire input end;

a third driving pulser, wherein the third driving pulser is formed by a third MOS type field-effect transistor and a sixth diode, wherein a drain electrode of the third MOS type field-effect transistor is connected to a negative electrode of the sixth diode and a source electrode of the third MOS type field-effect transistor is connected to a positive electrode of the sixth diode, a wherein grid electrode of the third MOS type field-effect transistor is configured to input a third voltage adjustment pulse signal, and wherein the drain electrode of the third MOS type field-effect transistor is further connected to the first positive wire input end;

a fifth diode, wherein a negative electrode of the fifth diode is connected to the source electrode of the third MOS type field-effect transistor, and wherein a positive electrode of the fifth diode is connected to the first negative wire input end;

a third inductor, wherein a first electrode of the third inductor is connected to the negative electrode end of the fifth diode; and a fifth capacitor, wherein a first electrode of the fifth capacitor is connected to a second electrode of the third inductor and the positive wire output end, and wherein a second electrode of the fifth capacitor is connected to the negative wire output end.

4. A voltage pre-regulator power supply circuit system, comprising multiple voltage pre-regulator power supply circuits connected in parallel, wherein the voltage pre-regulator power supply circuit is a voltage pre-regulator power supply circuit comprising:

a voltage step-up unit comprising a positive wire input end, a negative wire input end, a first positive wire output end corresponding to the positive wire input end, and a first negative wire output end corresponding to the negative wire input end, wherein the positive wire input end and the negative wire input end are configured to input a to-be-adjusted voltage to the voltage step-up unit, wherein the first positive wire output end and the first negative wire output end are configured to output the to-be-adjusted voltage that has been adjusted by the voltage step-up unit to obtain a primary to-be-adjusted voltage, and wherein the voltage step-up unit configured to control the to-be-adjusted voltage by using a voltage difference frequency; and a voltage step-down unit, comprising a first positive wire input end, a first negative wire input end, a positive wire output end corresponding to the first positive wire input end, and a negative wire output end corresponding to the first negative wire input end, wherein the first positive wire input end is connected to the first positive wire output end, wherein the first negative wire input end is connected to the first negative wire output end, wherein the first positive wire input end and the first negative wire input end are configured to input the primary to-be-adjusted voltage to the voltage step-down unit, wherein the positive wire output end and the negative wire output end are configured to output the primary to-be-adjusted voltage that has been adjusted by the voltage step-down unit to obtain an output voltage, and wherein the voltage step-down unit is configured to control, by using the voltage difference frequency, the primary to-be-adjusted voltage that is input through the first positive wire input end and the first negative wire input end.

5. A voltage adjustment method, comprising:

receiving a to-be-adjusted voltage through a positive wire input end and a negative wire input end;

changing, in a control mode in which a connection time is fixed and a disconnection time is adjusted, a duty cycle for the to-be-adjusted voltage to obtain a primary adjusted voltage; and changing, in a control mode in which a disconnection time is fixed and a connection time is adjusted, a duty cycle for the primary adjusted voltage to obtain an output voltage.

* * * * *